United States Patent [19]

Kurosawa

[11] Patent Number: 4,972,499
[45] Date of Patent: Nov. 20, 1990

[54] PATTERN RECOGNITION APPARATUS

[75] Inventor: Yoshiaki Kurosawa, Yokohama, Japan

[73] Assignee: Kabushiki Kaisha Toshiba, Kawasaki, Japan

[21] Appl. No.: 329,871

[22] Filed: Mar. 28, 1989

[30] Foreign Application Priority Data

Mar. 29, 1988 [JP] Japan .................................. 63-73090

[51] Int. Cl.$^5$ ............................................. G06K 9/46
[52] U.S. Cl. ........................................ 382/38; 382/9; 382/22; 382/30
[58] Field of Search ................... 382/38, 13, 9, 30, 36, 382/22, 34

[56] References Cited

U.S. PATENT DOCUMENTS 3,832,682  8/1974  Brok et al. ............................. 382/38
4,521,909  6/1985  Wang ..................................... 382/38
4,589,142  5/1986  Bednar .................................. 382/38

OTHER PUBLICATIONS

"Recognition of Handprinted Kanji Characters by a Relaxation Method", Proc. 6th ICPR; Yamamoto, K. and A. Rosenfeld; Dec. 1980.
"Attributed Grammar—A tool for combining Syntactic and Statistical Approaches to Pattern Recognition", IEEE trans. on SMC, vol. SMC-10, No. 12; Tsai, W. H. and K. S. Fu; Dec. 1980.
"Attributed String Matching with Statistical Constraints for Character Recognition", Proc. 8th ICPR; Yoshiaki Kurosawa and Haruo Asada; Oct., 1986.

Primary Examiner—David K. Moore
Assistant Examiner—Yon Jung
Attorney, Agent, or Firm—Oblon, Spivak, McClelland, Maier and Neustadt

[57] ABSTRACT

A pattern recognition apparatus has a contour segmentation unit for dividing an input pattern into segments, a characteristic extraction unit for extracting characteristics of the input segments, and a reference unit for storing characteristic data of reference patterns. The reference unit includes a main reference and a detailed matching reference. The main reference stores partial pattern characteristic data representing the characteristics of segments of each reference pattern. The detailed matching reference stores detailed characteristic data of each reference pattern together with a program for specifying an operation procedures thereof. A matching processor sequentially compares and collates the input pattern with the reference patterns to find out that standard pattern with which the input pattern is matched with the highest similarity. When the input pattern is matched with several reference patterns, a detailed recognition unit performs a detailed recognition process using the detailed characteristic data of these reference patterns to finally select the correct one from among the reference patterns. The main reference additionally stores identification marks to identify specific reference segments necessary to acquired the above detailed characteristic data.

2 Claims, 4 Drawing Sheets

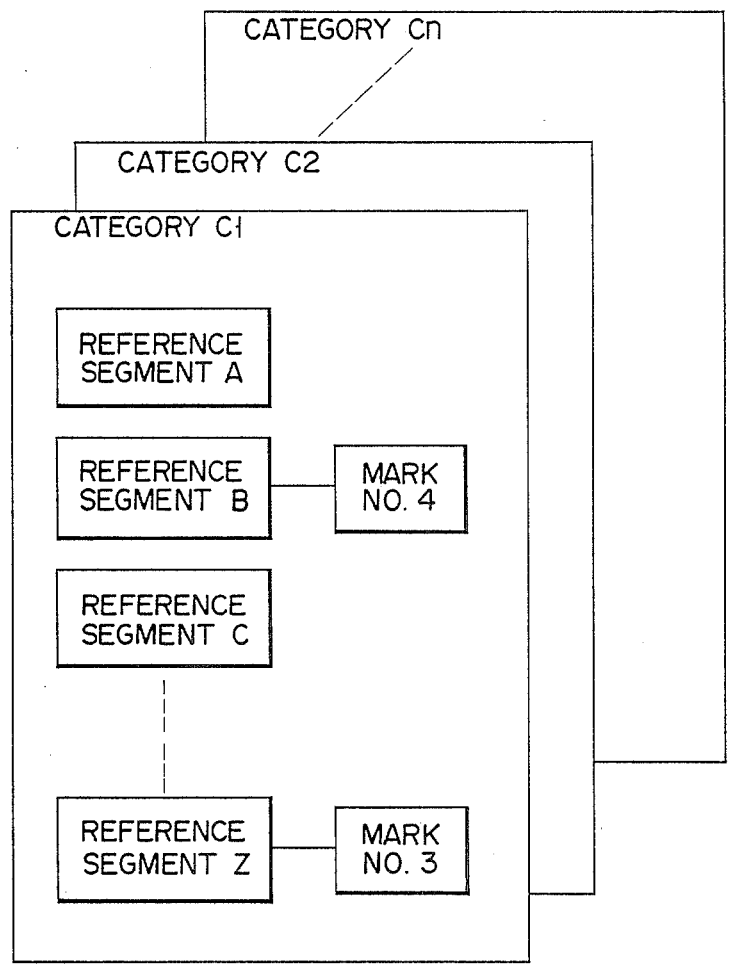
F I G. 2

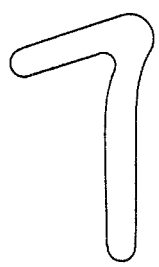
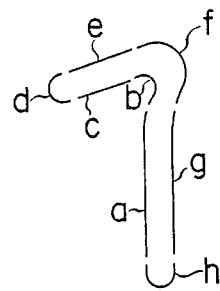
F I G. 3A      F I G. 3B
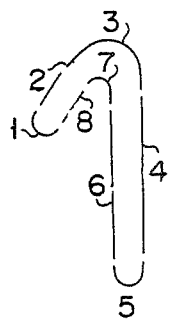
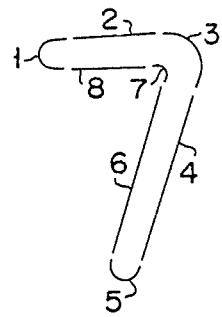
F I G. 4B      F I G. 4C
| | |
|---|---|
| 1a | #P0 |
| 1 | e |
| 2a | #P1 |
| 2 | s |
| 3a | #P2 |
| 3 | c |
| 4 | s |
| 5 | e |
| 6 | s |
| 7a | #P3 |
| 7 | c |
| 8 | s |
F I G. 4A
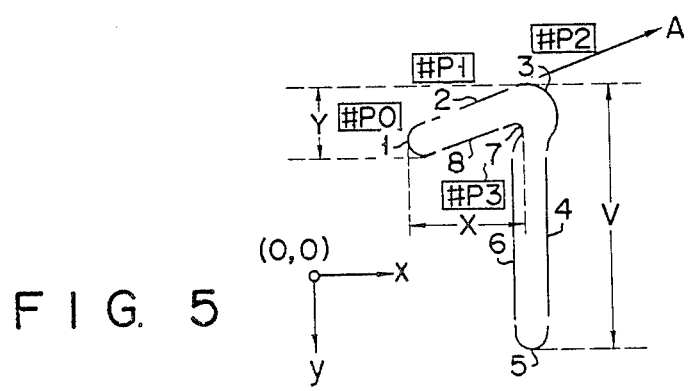
F I G. 5

PATTERN RECOGNITION APPARATUS

BACKGROUND OF THE INVENTION

1. Field of the Invention

The present invention is directed to computer-assisted systems which automatically recognize an input pattern such as a picture image, voices and characters, and relates particularly to a pattern recognition apparatus which recognizes handwritten character patterns using a structural analysis method.

2. Description of the Related Art

Today, various methods have been developed as automatic pattern recognition methods for handprinted characters. A structural analysis method executes pattern recognition by detecting a contour pattern of an input character, dividing the detected contour line into a plurality of partial patterns (normally called "segments") and searching the structure of the input character based on the shapes or characteristics of these partial patterns. Such a method is effective in recognizing, with high accuracy, strongly distorted characters which are freely handwritten by people.

A pattern recognition apparatus employing a structural analysis method uses, as reference data (reference segments), characteristic data of standard segment shapes that are prepared by executing a statistical analysis on standard contour patterns of characters registered for the individual categories. The reference segments are significant in characterizing the shape of a character. These reference segments are registered in a main reference section. To recognize the pattern of an input character, first, the contour pattern of this input character is detected, followed by segmentation of the detected contour pattern, thereby providing partial contour segments of the input character pattern. Each contour segment is sequentially compared, and collated, with segments corresponding to one reference character pattern by a matching unit. When all the segments of one input character are matched with all the reference segments of a reference character, pattern recognition for the input character is said to be successful. In the matching process, if the input does not uniquely match with a single reference, the next reference character pattern will be selected and comparison and collation between the input and the selected pattern will be carried out; this process is repeated until pattern matching succeed.

In the reference section of the pattern recognition apparatus, registered reference characters are typically classified into several categories. For instance, English characters are generally classified into alphabets and numerals. With such a simple reference structure, however, if an input character pattern is intricate, it may be undesirably and erroneously matched with a reference character that belongs to a different category, but yet has a high similarity in shape. This impairs the accuracy of pattern recognition. Given that an input character is "1" (alphanumeral), if it is discriminated to be matched with a reference character belonging to a different category, such as "7" (also an alphanumeral), due to their similarity in shape, the pattern recognition process for the input would fail. Failure in pattern recognition of a handwritten character pattern deteriorates the accuracy of the recognition result and impairs the reliability of this pattern recognition process.

As a solution to this problem, there is an attempt or measure to additionally describes a detailed recognition program for each reference character in the reference section in association with each segment. More specifically, each reference segment of each reference character is added with detailed sub-data such as the length, curvature and positional relationship between adjoining segments. In comparing and collating an input character pattern with reference characters, when the input is discriminated to be matched with reference characters of several different categories through a main pattern matching process, a detailed pattern recognition process is executed using the detailed recognition program to thereby determine which one of the probable categories is correct.

With such an arrangement, however, the reference data structure is very intricate and rewriting or updating the contents of the reference is not an easy task for operators. For instance, in updating reference segment data of one reference character, the detailed recognition program added to each segment of that reference character should also be updated every time. Such an updating work is troublesome to operators and it is significantly difficult to self-manage the correspondence or corresponding relationship between old and new detailed recognition programs existing respectively before and after updation.

SUMMARY OF THE INVENTION

It is therefore an object of the present invention to provide a new and improved pattern recognition apparatus which can automatically recognize strongly distorted input patterns with high accuracy and can facilitate the accompanying work of updating the contents of a reference to thereby improve reference management/maintenance by operators.

In accordance with the above object, the present invention is addressed to a specific pattern recognition apparatus which comprises:

a segmentation unit for receiving an input pattern and segmenting the input pattern into partial patterns;

a characteristic extraction unit for extracting characteristics of each of the partial patterns as input pattern characteristic data;

reference unit for storing characteristics of partial patterns of each of standard patterns as reference characteristic data; and a processor unit, coupled to the characteristic extraction unit and the reference unit, for executing a matching process involving comparison of the input pattern characteristic data with the reference characteristic data to find out, from the reference unit, that standard pattern with which the input pattern is matched.

The reference unit has first and second reference sections. The first reference section stores the standard patterns and identification marks for identifying a specific one of the partial patterns of the standard patterns. The second reference section stores information for investigating detailed characteristics of each of the standard patterns. When the input pattern is matched with a plurality of standard patterns, the processor unit uses the detailed characteristic information to finally identify one standard pattern which is correctly matched with the input pattern from among the matched standard patterns.

The invention and its objectives and advantages will become more apparent from the detailed description of a preferred embodiment of this invention presented below.

BRIEF DESCRIPTION OF THE DRAWINGS

In the following detailed description, reference is made to the accompanying drawings in which:

FIG. 2 is a diagram illustrating model contents of a main reference 22;

FIG. 3A is a diagram illustrating the shape of an input character pattern;

FIG. 3B is a diagram illustrating segments of the contour line of the input character pattern shown in FIG. 3A;

FIG. 4A is a model diagram illustrating characteristic data of reference segments of one reference pattern and identification marks being stored in the main reference 22;

FIGS. 4B and 4C are diagrams illustrating standard character patterns stored in the main reference 22 and divided into segments;

FIG. 5 is a diagram illustrating plural pieces of detailed characteristic data given for the standard pattern shown in FIG. 4C.

DETAILED DESCRIPTION OF THE PREFERRED EMBODIMENTS

Figure 1:
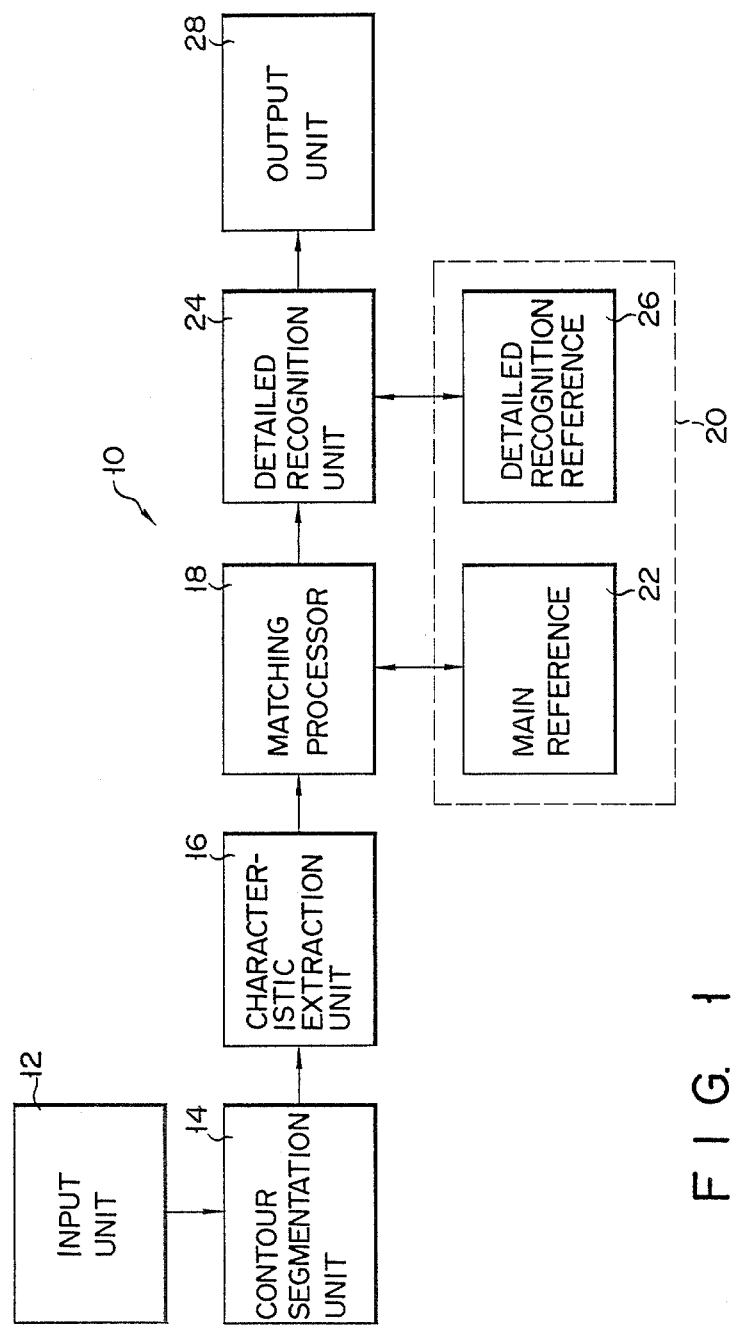
FIG. 1 is a schematic block diagram illustrating the general arrangement of a pattern recognition apparatus according to a preferred embodiment of this invention.

Referring to FIG. 1, a pattern recognition apparatus according to one preferred embodiment of this invention is generally designated by reference numeral "10." This apparatus automatically recognizes handwritten character input patterns, for example, but it is not restricted to such an input; the input may be a graphic image or a voice.

An input pattern is scanned by, and subjected to the necessary processes in, an input unit 12, and is then supplied to a contour segmentation unit 14. This unit 14 detects the contour line of the input character pattern and segments the detected contour line into a plurality of partial patterns (called "contour segments" or simply "segments"). The segment data is transferred to a characteristic extraction unit 16 where it is subjected to characteristic extraction. The characteristic extraction unit 16 produces characteristic data of each segment of the input character pattern, which data is supplied to a matching processor 18.

A reference unit 20 is coupled to the matching processor 18, and includes a main reference 22 which is associated directly with the matching processor 18. The main reference 22 stores segments (reference segments) of each of standard or reference character patterns. These reference character patterns are stored, classified for the individual character categories, in the main reference 22. The matching processor 18 executes pattern recognition in such a manner that it compares and collates the input pattern with a certain reference pattern to identify that reference pattern which is matched with the input pattern with high similarity.

The matching processor 18 is coupled to a detailed recognition unit 24 which is associated with a detailed matching reference 26 included in the reference unit 20. When matching between the input pattern and a reference reference pattern is partially or entirely successful in the matching process executed by the matching processor 18, then the detailed recognition unit 24 becomes operative. The detailed recognition unit 24 performs a detailed pattern recognition process on the input pattern based on data or a program described in the detailed matching reference 26. The final recognition result attained by the detailed recognition unit 24 is output from an output unit 28.

FIG. 2 illustrates a model status of reference pattern stored in the main reference 22. For each of reference character patterns (hereinafter referred to as "category") C1, C2, ..., Cn, partial patterns (referred to as "reference segments") are stored as characteristic data A, B, C, ..., Z in the main reference 22. Those of the reference segments A, B, C, ..., Z which are used in a detailed pattern recognition process in the detailed recognition unit 24, are affixed with identification marks as shown in FIG. 2. According to this embodiment, the identification mark No. 4 is affixed to the characteristic data of the reference segment B, and the identification mark No. 3 to the characteristic data of the reference segment Z.

The detailed matching reference 26 stores such a description as "Specify segments (X, Y) of the input pattern respectively corresponding to identification marks No. 3 and No. 4 and make a detailed discrimination using the correspondence between them" which is used in comparison and collation between the input pattern and the reference pattern C1. In executing a detailed recognition process on the matching result from the matching processor 18, in accordance with the above particular description stored in the detailed matching reference 26, the detailed recognition unit 24 specifies the input segments X and Y corresponding to the reference segments B and Z of the reference pattern having the identification marks No. 3 and No. 4 and executes the detailed recognition process using the correspondence between these segments. The description in the detailed matching reference 26, concerning the use of the above marks, is automatically transferred to the detailed recognition unit 24 at the same time the detailed recognition process is initiated, thus ensuring smooth operation of the detailed recognition unit 24.

The automatic input character recognition operation of the pattern recognition apparatus will now be described in more detail with reference to the input pattern exemplified in FIG. 3. When the numeral pattern "7" shown in FIG. 3A is input to the input unit 12, the contour segmentation unit 14 detects the general contour line of the input pattern and segments the detected contour pattern into partial contour lines a to h as shown in FIG. 3B. These partial contour lines are hereinafter called "partial patterns" or "input segments" each of which is accompanied by its characteristic data such as position data, length data and vector data indicating the tangential direction.

Reference pattern characteristic data defining the sequence of reference segments as shown in FIG. 4A is registered in the main reference 22; the alphabets "e," "s" and "c" included in the reference characteristic data represents data about the characteristics of the partial contours. For instance, "e" indicates that the partial contour is the end, "s" the middle linear portion, and "c" the middle curved portion. The code data sequence of the reference segment characteristic data, "escsescs," shown in FIG. 4A may result in that it indicates the character characteristic of both the character pattern "1" (FIG. 4B) and the character pattern "7" (FIG. 4C). This means that the matching process in the matching processor 18 using the reference data stored in main reference 22 alone would cause the input pattern to be discriminated to be matched with both of different character patterns "1" and "7." Therefore, the totally accurate pattern recognition cannot be expected from the matching process in the matching processor 18 alone. In other words, the matching process in the matching processor 18 using the reference data stored in the main reference 22 alone cannot accurately distinguish whether the input pattern is the reference character pattern "1" or "7." To realize the accurate recognition, it is necessary to execute an additional process in the detailed recognition unit 24 using the detailed matching reference 26.

When the input segment patterns shown in FIG. 3A are transferred to the characteristic extraction unit 16 from the contour segmentation unit 14, the unit 16 compares and collates the input pattern characteristic data with the reference pattern characteristic data shown in FIG. 4A for each corresponding segments. At this time, the correspondence between the input pattern segments and the reference pattern segments, as indicated below, is discriminated.

| Input Segment | Reference Segment |
|---|---|
| d | 1 |
| e | 2 |
| f | 3 |
| g | 4 |
| h | 5 |
| a | 6 |
| b | 7 |
| c | 8 |

In this case, if it is verified that the input pattern is matched with the pattern "7" and that it is also matched with the pattern "1", the matching processor 18 outputs such a pattern recognition result that the input pattern is matched with the reference patterns "1" and "7." This recognition result is supplied to the detailed recognition unit 24 located on the next stage.

Figure 6:
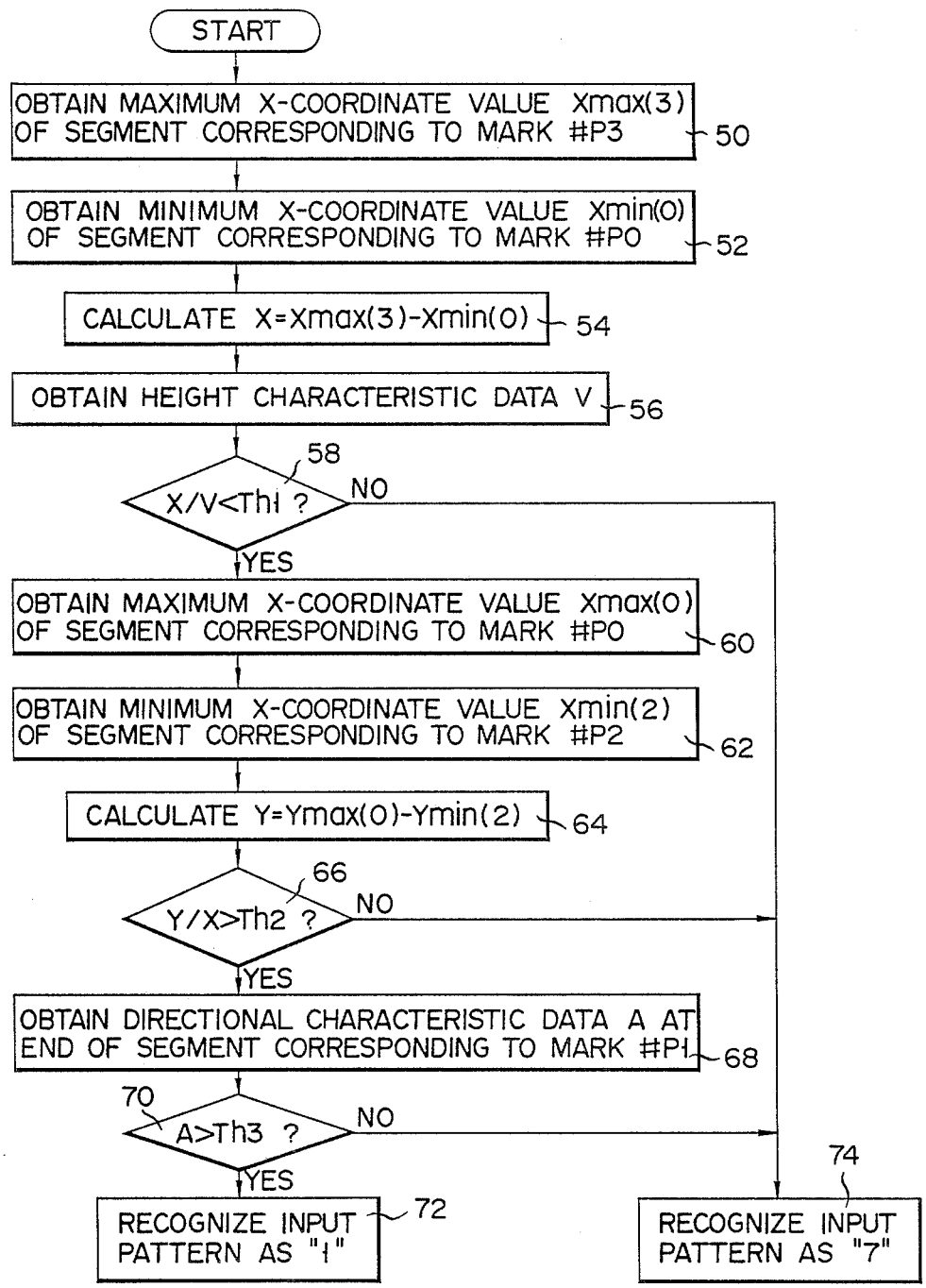
FIG. 6 is a diagram illustrating a schematic flowchart of a detailed pattern recognition process executed in a detailed recognition unit shown in FIG. 1, using detailed characteristic data.

The detailed recognition unit 24 executes a final recognition such that it performs a detailed recognition process on the recognition result from the matching processor 18 and discriminates whether the input pattern is the reference pattern "1" or "7." At this time, the detailed recognition process is executed in accordance with the description about the use of the marks stored in the detailed matching reference 26. According to this embodiment, as shown in FIG. 5, the description stored in the detailed matching reference 26 includes the following as detailed recognition data:

(i) The horizontal distance X between the leftmost point of the input segment corresponding to reference segment 1 and the rightmost point of the input segment 7 (see steps 50, 52, and 54 in FIG. 6);

(ii) The vertical distance Y between the lowermost point of the segment 1 and the uppermost point of the input segment 3 (see steps 60, 62, and 64 in FIG. 6);

(iii) The height data of an input pattern or the vertical distance V between the uppermost point of the input segment corresponding to the reference segment 3 and the lowermost point of the input segment corresponding to the reference segment 5 (see step 56); and (iv) The directional data about the middle linear segment 2 or the vector data representing the inclination of this segment (see step 66).

Using these detailed recognition information, the detailed recognition unit 24 executes the detailed recognition process comprising the following steps with respect to the corresponding segments of the input character pattern:

(1) Comparing X/V with a predetermined threshold value Th1 (step 58);

(2) Comparing Y/X with a predetermined threshold value Th2 (step 66); and (3) Comparing the direction A with a predetermined threshold value Th3 (step 68).

If this process results in $X/V < Th1;$ $Y/X > Th2;$ and

Direction $A > Th3$, the input pattern is finally recognized to be the numeral "1" (step 70). If the above discrimination is negative for all the conditions or parameters, the input pattern is finally recognized to be the numeral "7" (step 72).

It should be noted that in the above detailed recognition process executed by the unit 24, the detailed characteristic data V can be attained substantially irrespective of the data about the partial contours of the input pattern; however, the other detailed characteristic data X, Y and A should be computed by actually using the contour data of the input segments corresponding to the reference segments 1, 2, 3 and 7. With regard to the standard pattern characteristic data shown in FIG. 4A, therefore, marks "#Pi" (i=0, 1, 2, 3) are affixed to those portions "1," "2," "3" and "7" which respectively correspond to the reference segments 1, 2, 3, and 7 segments necessary to compute the detailed recognition data in the above detailed recognition process. Referring to those additionally provided segment special codes, the detailed recognition unit 24 can effectively search the reference segments which are used to compute the values of the detailed characteristic data X, Y and A necessary for executing the detailed recognition process. This can ensure effective extraction of the characteristic data of the partial contour lines of the input pattern, i.e., the input segments, thereby improving the efficiency of the detailed recognition process. FIG. 6 illustrates a flowchart for the final pattern recognition process and computation of the values of the detailed recognition data X, Y, V and A. A program that defines the rules for the process sequence is stored as firmware in the detailed matching reference 26.

According to the present pattern recognition apparatus, the detailed recognition unit 24 is designed such that using the detailed recognition data stored in the detailed matching reference 26, the unit 24 additionally performs a secondary pattern recognition or a detailed recognition process with respect to the matching result attained by the primary pattern recognition executed by the matching processor 18 using the main reference 22. Accordingly, the accuracy in recognizing an input pattern can be improved.

Furthermore, according to the present apparatus, the matching reference unit 20 has the main reference 22 for storing reference segment characteristic data of standard patterns and the detailed matching reference 26 for storing detailed characteristic data and a detailed recognition program. Marks #P are added to specific segments to identify them, which are included in the segments of each reference pattern stored in the main reference 22 and are necessary to compute the detailed recognition data in a detailed recognition process. In updating the contents of the main reference 22, for example, the reference pattern corresponding to a certain reference character, the correspondence between the reference segments before updation and those after updation can be easily and clearly made using the marks #P. Therefore, the detailed recognition data and the content of the detailed recognition program, both stored in the detailed matching reference 26, can be still effec-tively used even after updation of a reference pattern. Unnecessariness to alter the contents of the detailed matching reference 26 in updating the contents of the main reference 22 permits operators to easily and effectively deal with the contents of the matching reference unit 20. This can, therefore, facilitate updation of the reference contents of a pattern recognition apparatus capable of performing pattern recognition with high accuracy and can improve the management and maintenance of the reference unit by operators.

Although the invention has been described with reference to a specific embodiment, it shall be understood by those skilled in the art that numerous modifications may be made that are within the spirit and scope of the invention.

For instance, the method for segmenting an input pattern to be recognized into partial patterns, the characteristic extraction method, the matching method and the specific method for affixing identification marks, all employed in the present pattern recognition apparatus, may be basically changed to other existing methods. Further, the storage format of the reference patterns is not restricted to the above-described specific format, but may be modified in various forms. Furthermore, the above pattern recognition technique can be applied not only to characters but also other types of input patterns such as picture images and voices.

What is claimed is:

1. An apparatus for automatically recognizing an input pattern, comprising:
    (a) contour segmentation means for segmenting a detected contour line of an input pattern into an array of input contour segments;
    (b) characteristic extraction means for extracting a line characteristic of each of said input contour segments;
    (c) reference storage means for storing characteristic data of standard patterns, said reference storage means having,
    main reference storage means for storing partial pattern characteristic data representing line characteristics of an array of reference contour segments of each of said standard patterns, and
    detailed matching reference storage means for storing detailed line characteristic data of each array of said standard patterns together with a program for specifying an operation sequence of said detailed characteristic data; and
    (d) matching processor means, connected to said characteristic extraction means and said main reference storage means, for extracting a primary matching process in which said input contour pattern is sequentially compared and collated with said standard contour patterns to find out that standard pattern with which said input pattern is matched with highest similarity;
    (e) detailed recognition means, connected to said matching processor means and said detailed matching reference storage means, for executing a secondary recognition process in such a manner that, when said input contour pattern is matched in its line characteristic with several standard contour patterns, said detailed recognition means executes a detailed recognition process using said detailed characteristic data of partial patterns of input patterns corresponding to specific partial patterns said standard patterns to select a correct standard contour pattern from among said matched standard contour patterns,
    said main reference storage means additionally storing identification marks for identifying specific reference contour segments necessary to acquire said detailed characteristic data, said marks absolutely identifying the partial patterns corresponding to the specific reference segments regardless of the sequence of appearance thereof in the array of said input segments.

2. The apparatus according to claim 1, wherein said identification marks include code data.

* * * * *